(12) United States Patent
Moskowitz

(10) Patent No.: US 9,402,045 B2
(45) Date of Patent: Jul. 26, 2016

(54) METHOD AND APPARATUS FOR DISPLAYING ELECTRONIC PROGRAM GUIDE INFORMATION

(75) Inventor: David K. Moskowitz, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1130 days.

(21) Appl. No.: 10/939,065

(22) Filed: Sep. 9, 2004

(65) Prior Publication Data

US 2005/0160456 A1 Jul. 21, 2005

Related U.S. Application Data

(60) Provisional application No. 60/608,936, filed on Sep. 9, 2003.

(51) Int. Cl.
| | | |
|---|---|---|
| *H04N 5/445* | (2011.01) | |
| *H04N 21/422* | (2011.01) | |
| *H04N 21/426* | (2011.01) | |
| *H04N 21/431* | (2011.01) | |
| *H04N 21/454* | (2011.01) | |
| *H04N 21/482* | (2011.01) | |
| *H04N 21/84* | (2011.01) | |

(52) U.S. Cl.
CPC ..... *H04N 5/44543* (2013.01); *H04N 21/42204* (2013.01); *H04N 21/42692* (2013.01); *H04N 21/4314* (2013.01); *H04N 21/454* (2013.01); *H04N 21/4821* (2013.01); *H04N 21/84* (2013.01)

(58) Field of Classification Search
CPC ................. H04N 21/42204; H04N 21/42692; H04N 21/84; H04N 21/454; H04N 21/4821; H04N 21/4314
USPC .......................... 725/45, 35, 38, 52, 46, 132
See application file for complete search history.

(56) References Cited

U.S. PATENT DOCUMENTS

| | | | | |
|---|---|---|---|---|
| 5,734,853 | A * | 3/1998 | Hendricks et al. ............ | 715/716 |
| 6,175,362 | B1 * | 1/2001 | Harms et al. ................... | 715/721 |
| 6,177,931 | B1 * | 1/2001 | Alexander et al. .............. | 725/52 |
| 6,262,722 | B1 * | 7/2001 | Allison et al. ................... | 725/39 |
| 2002/0049971 | A1 * | 4/2002 | Augenbraun et al. .......... | 725/39 |
| 2002/0162108 | A1 * | 10/2002 | Lin-Hendel ..................... | 725/52 |
| 2003/0121041 | A1 * | 6/2003 | Mineyama ...................... | 725/46 |
| 2003/0149988 | A1 * | 8/2003 | Ellis et al. ........................ | 725/87 |
| 2003/0196202 | A1 * | 10/2003 | Barrett et al. ................... | 725/50 |
| 2004/0040039 | A1 * | 2/2004 | Bernier ............................ | 725/46 |
| 2004/0073921 | A1 * | 4/2004 | Neely et al. ..................... | 725/45 |
| 2004/0268403 | A1 * | 12/2004 | Krieger et al. ................. | 725/112 |
| 2005/0028208 | A1 * | 2/2005 | Ellis et al. ........................ | 725/58 |
| 2005/0204388 | A1 * | 9/2005 | Knudson et al. ................ | 725/58 |
| 2005/0204389 | A1 * | 9/2005 | Proehl et al. .................... | 725/60 |
| 2005/0251822 | A1 * | 11/2005 | Knowles et al. ................ | 725/39 |
| 2007/0288959 | A1 * | 12/2007 | Istvan et al. ..................... | 725/39 |

* cited by examiner

*Primary Examiner* — Jivka Rabovianski
(74) *Attorney, Agent, or Firm* — Ingrassia Fisher & Lorenz, P.C.

(57) ABSTRACT

The present invention provides a logically organized electronic program guide separated into categories. Each category has a theme. Inside each theme-based category there is a listing of television programming. In this way, the subscriber can locate a desired theme and then determine a desired program from the list in the category.

3 Claims, 3 Drawing Sheets

| Theme: News | | | | |
|---|---|---|---|---|
| Channel | Number | 8:00 p.m. | 8:30 p.m. | 9:00 p.m. |
| CNN | 200 | News | News | News |
| MSNBC | 209 | Financial Report | Hardball | News |
| FOX News Channel | 205 | FOX Report | The O'Reilly Factor | |
| ESPNews | 145 | SportsZone | | |
| C-SPAN | 210 | Congressional Hearings | | |
| Bloomberg TV | 203 | The Charlie Rose Show | | |
| CNNfn | 206 | Street Sweep | Your Money | |

| Theme: News | | | | |
|---|---|---|---|---|
| Channel | Number | 8:00 p.m. | 8:30 p.m. | 9:00 p.m. |
| CNN | 200 | News | News | News |
| MSNBC | 209 | Financial Report | Hardball | News |
| FOX News Channel | 205 | FOX Report | The O'Reilly Factor | |
| ESPNews | 145 | SportsZone | | |
| C-SPAN | 210 | Congressional Hearings | | |
| Bloomberg TV | 203 | The Charlie Rose Show | | |
| CNNfn | 206 | Street Sweep | Your Money | |

FIG. 3

| Theme: Sports | | | | |
|---|---|---|---|---|
| Channel | Number | 8:00 p.m. | 8:30 p.m. | 9:00 p.m. |
| FOX Sports | 149 | Totally NASCAR | Beyond the Glory | Sunday Night Fights |
| ESPNews | 142 | Sports Center | | |
| ESPN | 140 | NHL Tonight | Sports Center | |
| ESPN 2 | 144 | Atlanta Braves vs. New York Mets | | |
| The Golf Channel | 401 | Movie: Bobby Jones, Stroke of Genuis | | |
| ESPN Classic | 143 | 1982 NBA Finals (Game Three) | | |

FIG. 4

METHOD AND APPARATUS FOR DISPLAYING ELECTRONIC PROGRAM GUIDE INFORMATION

RELATED APPLICATIONS

The present application claims the benefit under 35 U.S.C. §1169(e) to U.S. Provisional Patent Application No. 60/608,936, which was filed on Sep. 9, 2003, and entitled "THEME-BASED ELECTRONIC PROGRAM GUIDE," which is incorporated by reference into the present application in its entirety.

FIELD OF THE INVENTION

The present invention relates to a method and apparatus for displaying electronic program guide information.

BACKGROUND OF THE INVENTION

The prior art includes various methods and devices for displaying electronic program guide (EPG) information. Commonly, such information is displayed as a grid of cells. Channels are often listed along the vertical axis while time is displayed along the horizontal axis. Programs are represented by cells that have a horizontal length that corresponds to the temporal length of the program.

In many television systems, there may be one hundred or more channels that need to be displayed by an EPG. Given that most EPGs list between three and ten channels per page, it is clear that many pages of EPG screens may be needed to present all of the EPG data. This may make it difficult for users of EPGs to quickly and efficiently find the programming that they are interested in.

In order to alleviate the foregoing problem, some prior art systems utilize theme based searches of individual programs. Such theme based searching may provide the user with a list of individual programs that match a certain theme, e.g. movies, sports, news. Another prior art solution is the user based creation of favorite channel lists. Favorite channel lists allow the user to create mini-EPGs which just show the channels that the user is interested in. In this way, the user may not have to page through screens of data related to television channels that he is not interested in. Experience shows that the foregoing methods of filtering EPG data down to a useable size are not ideal. Many users may find the listing of individual programs provided by a theme based search to be cumbersome. Further, it may take a considerable amount of time and effort to create favorite lists in a system that has many hundreds of channels.

BRIEF SUMMARY OF THE INVENTION

The present invention provides a method and apparatus to filter EPG information for logical presentation to a user. Thus it is an object of this invention to provide the user with a theme based or thematic EPG, wherein channels, as opposed to programs, are grouped according to themes. It is a further object of this invention to provide the user, on a channel basis, with pre-determined subsets of EPG information. It is still yet a further object of this invention to provide the user with the ability to select groups of pre-selected channels to be presented in an EPG to reduce the amount of information that the user must sift through in order to find the programming that they are interested in. An additional object of the invention is to provide EPG data which categorizes channels based upon aspects of their content. These and other objects of the invention will be described below in a detailed description of certain embodiments of the invention. The embodiments are illustrative and do not set out the full scope of the invention which is defined in the claims.

BRIEF DESCRIPTION OF THE SEVERAL VIEWS OF THE DRAWINGS

FIG. 3 is an example of an embodiment of an electronic program guide using theme-based categories.

FIG. 4 is an example of another embodiment of an electronic program guide using theme-based categories.

Figure 1:
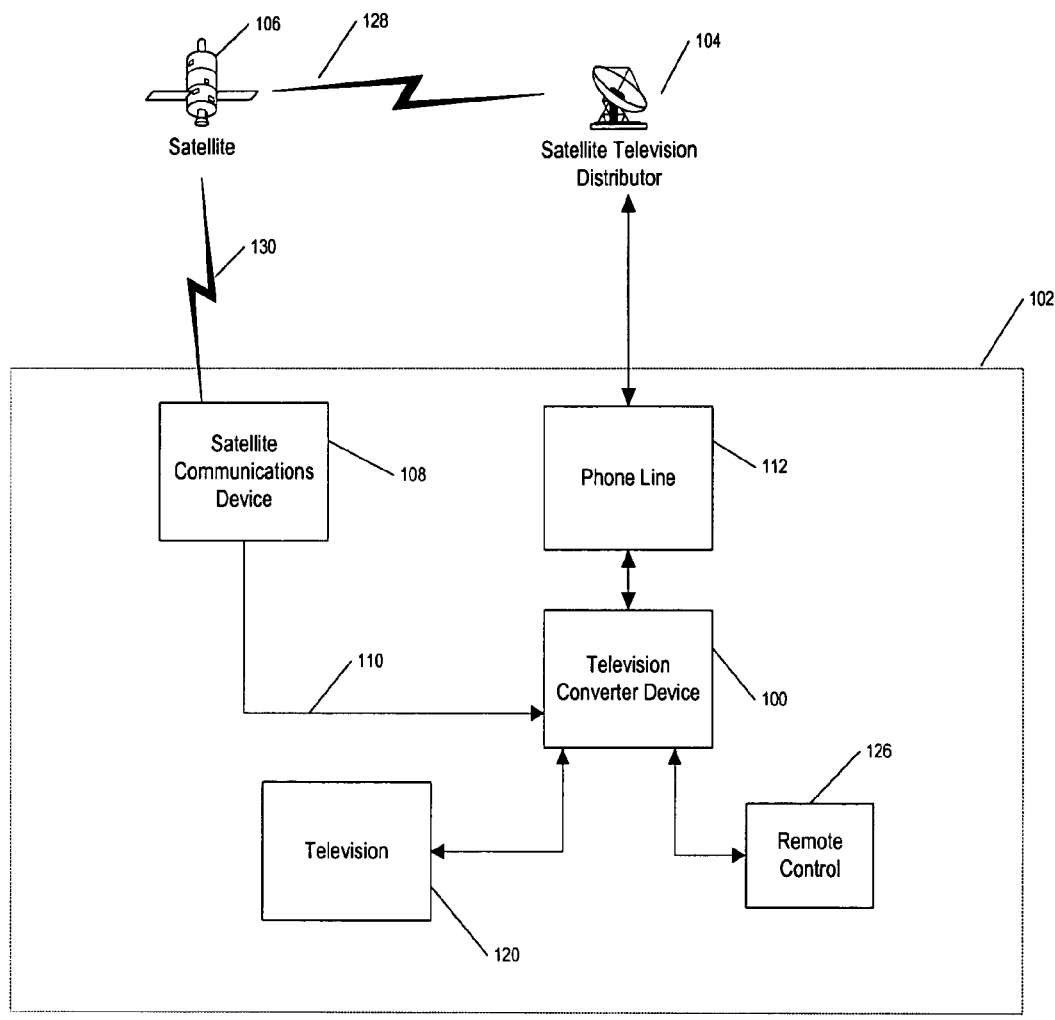
FIG. 1 is a high level block diagram of a system using a television receiver of an embodiment the present invention.

For clarification, the drawings use a nomenclature for reference numerals that has two parts. The first part of the reference numeral is the drawing number, and it is followed by the second part, a two digit identifier (drawing 1 uses 1xx; drawing 3 uses 3xx). For example, two reference numerals in drawing 1 may be "102" and "104." A reference numeral in one drawing may be referred to in subsequent drawings; the same reference numeral in later drawings refers to the same item.

DETAILED DESCRIPTION OF THE INVENTION

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recording (DVR) devices. The present invention may also be applicable to digital-versatile-disc (DVD) recording devices or other television recording devices. One skilled in the art will recognize that the present invention can apply elsewhere.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. "Digital video recorder (DVR)" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and PVR. For the remainder of this disclosure, specific embodiments will be described using a television converter device that implements satellite technology.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel." One skilled in the art will recognize that the digital data carried by a satellite transmission may also include EPG data and other types of data or information.

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the EPG data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity.

Thus, in satellite television service a channel may not be the same as in broadcast television service. Rather, channels may be more properly termed service providers in satellite television service. The term "channel" will be used in this description to describe the service providers and the virtual channels they may occupy.

FIG. 1 presents an embodiment of a home entertainment system 102 that includes a television converter device 100 in the form of a satellite set-top-box. Generally, the satellite set-top-box 100 may receive one or more television signals from a cable television distributor (not shown), from a broadcast television distributor (not shown) or from a satellite television distributor 104. As a preferred embodiment, home entertainment system 102 receives signals from satellite television distributor 104. One skilled in the art will recognize that set-top-box 100 may also receive video-digital subscriber line (DSL), DSL, Internet, wireless and other signals from content or video distributors. The satellite set-top-box 100 may process television signals and may send the processed signals to peripheral electronic devices, such as a television 120 and remote control 126. The satellite set-top-box 100 also may accept commands from a remote control 126 or other peripheral electronic devices. More detail about the functionality of the satellite set-top-box 100 is provided below.

To further describe the home entertainment system, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 Mhz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite set-top-box 100 may be possible.

Figure 2:
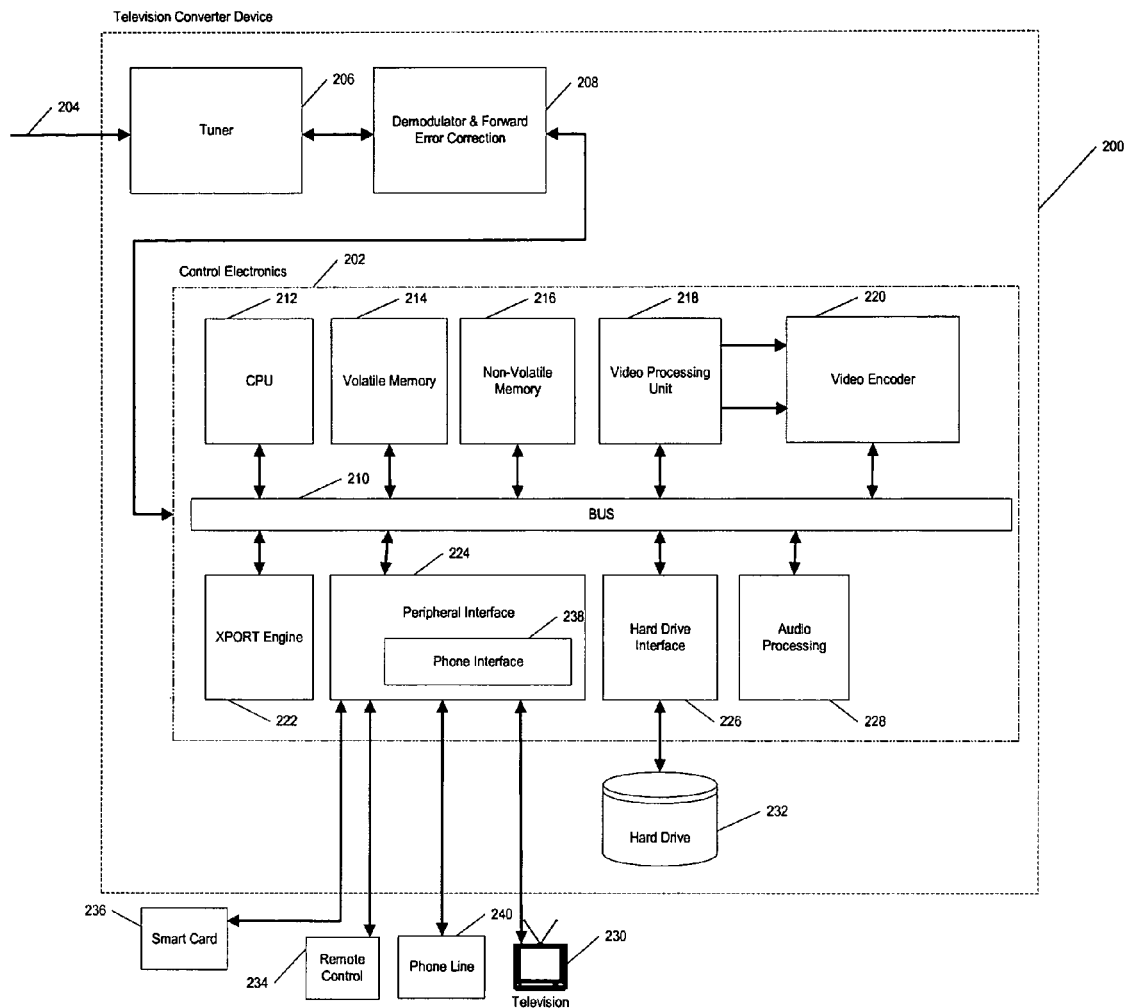
FIG. 2 is a high level block diagram of a television receiver of an embodiment of the present invention.

FIG. 2 provides a high level block diagram for the satellite television converter device 100, 200 with DVR functionality in accordance with the present invention.

The signal 110, 204 that arrives at the satellite set top box 200 may undergo extensive processing. The television converter 200 may include one or more tuner devices 206 that may receive a satellite signal 204. In this embodiment, tuner device 206 acquires a satellite signal 204 from satellite television distributor 104. Tuner device 206 may initially process the satellite signal 204. Tuner device 206 may also receive subscriber commands in the form of signals from control electronics unit 202. Signals from control electronics unit 202 may include, but is not limited to, a signal to tune to a transponder as part of the process of selecting a certain channel for viewing on a peripheral device. One skilled in the art would recognize that the tuner device 206 may include fewer, more, or different components.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error checking (FEC). FEC 208 may include, but is not limited to, inspecting parity bit or bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In this embodiment, satellite set-top-box 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In a preferred embodiment, control electronics unit 202 includes discrete electronic components combined into a single circuit with a shared bus 210. In other embodiments, control electronics unit 202 may be configured differently. For example, one or more of the control electronics unit 202 components in set-top-box 200 may be combined or omitted. The control electronics unit 202 may use a custom ASIC, such as from the LSILogic G11 family, or FPGA, such as from the Altera Stratix™ family. As a further example, one or more of the control electronics unit 202 components in set-top-box 200 may not share a bus 210, but may nonetheless be operatively connected by some other means. One skilled in the art will recognize that other configurations of set-top-box 200 and control electronics unit 202 are possible and within the scope of this invention. One skilled in the art will further recognize that some components of set-top-box 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUs) 212 or processors. A preferred embodiment of control electronics unit 202 contains a single CPU 212 that is operatively connected to the shared bus. In one embodiment, CPU 212 may be used, among other things, for logical operations for set-top-box 200 functions including, but not limited to, channel selection, recording control, EPG display and control and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may also contain one or more volatile memory components 214. Volatile memory components 214 may include, but are not limited to, one or more SDRAM memory chips. Similarly, control electronics unit 202 may contain non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within set-top-box 200 and control electronics unit 202. One skilled in the art will recognize that memory 214, 216 may be used for many purposes, including, but not limited to, storing EPG data and storing data for use by CPU 212.

In a preferred embodiment, signal 204 is in digital form (e.g., a digital stream) after demodulation and error correction. For example, digital stream 204 may use, but is not limited to using, the digital video broadcasting (DVB) transport standard. The digital stream 204 may be multiplexed and therefore require demultiplexing by XPORT Engine 222. Demultiplexing 222, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG or MPEG2 standards. Beyond the raw data, the separate digital data streams may include forward error correction, headers, checksums, or other information. All of this different information may be included in the digital television signal 204 processed by the satellite set-top-box 100. Control electronics unit 202 may therefore include one or more video processing units 218 that, among other video processing operations, may decode encoded signal 204. In a preferred embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, antialiasing, antiflutter and antiflicker filters, memory and video-rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. As a preferred embodiment, video encoder 220 may translate digital stream into a signal using the NTSC, PAL or SECAM standards. One skilled in the art will recognize that video encoder unit 220 may include other functionality, may be integrated into other electronic components of satellite set-top-box 200, and may encode digital stream 204 using other standards, including, but not limited to, MPEG and MPEG2.

Control electronics unit 202 may also include one or more hard drive interfaces 226 and hard drives 232. In a preferred embodiment, television converter device 200 contains one hard drive interface 226 and hard drive 232. Hard drive 232 may be used for many purposes, including, but not limited to, storing recorded programs, buffering currently-playing programs (e.g., buffering a program may allow a user to pause or rewind a program), storing EPG data, storing commands or functions for the control electronics unit 202, storing timers or record events, and storing data for other devices within or connected to the satellite set-top-box 200. As another example, hard drive 232 may be used to temporarily store data for processing by CPU 212. In this example, the hard drive 232 may allow the processor 212 to separate EPG data arriving as part of digital stream 208. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite set-top-box 200. For example, an external hard drive 232 may be connected to satellite set-top-box 200 using USB 2.0 or IEEE 1394 (FireWire) connections. Such an external hard drive may include a screen for portable viewing of programming stored on it.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital to audio converter (DAC) systems. One skilled in the art will recognize that other audio processing components and functionality may be accomplished using audio processing unit 228.

A satellite set-top-box 200 may be connected to one or more peripheral electronic devices through peripheral interface 224. These peripheral devices may include a stereo (not shown), television 230, smart card 236, VCR (not shown), or other devices. In a preferred embodiment, home entertainment system 102 minimally contains, but is not limited to, a television 230 and smart card 236. Television 230 may serve many purposes, including, but not limited to, displaying television programming, displaying the EPG, displaying timer conflicts, and displaying other types of data, graphics and programming. Peripheral devices may receive and/or send signals from the satellite set-top-box 200. For instance, the television 230 may receive video and audio signals and a stereo may receive only audio signals. A camcorder (not shown), on the other hand, may send video or audio signals to the satellite set-top-box 100 or receive audio and video signals from the set-top-box to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

The home entertainment system 102 may also include a remote control 126, 234 peripheral device, also sometimes referred to as a remote. The remote control 234 may be used to send commands to the satellite set-top-box 200. The remote control 234 may send commands via a wireless connection using, for example, infrared or UHF transmitters within the remote control 234. One example of an embodiment of a remote controller 234 is the EchoStar Technologies Corporation 721 Platinum Plus Remote, Part Number 121150, that includes an IR transmitter and an ultra high frequency (UHF) transmitter. The remote control 234 may be able to send signals to other peripheral electronic devices that form part of the home entertainment system 102, including, but not limited to, a television, stereo, VCR, or DVD player. The set-top-box 200 may also be able to send signals to the remote control 234, including, but not limited to, signals to configure the remote control 234 to operate other peripheral devices in home entertainment system 102. In some embodiments, the remote control 234 has a set of Light Emitting Diodes (LEDs). Some remote controls may include Liquid Crystal Displays (LCDs) or other screens. The remote control may include buttons, dials, or other man-machine interfaces. While the remote control 234 may often be the common means for a subscriber to communicate with the satellite set-top-box 200, one skilled in the art will recognize that other means of communicating with the set-top-box 200 are available, including, but not limited to attached keyboards, front panel buttons or touch screens.

The satellite set-top-box 200 may also include a remote control interface (not shown). A remote control interface may include any means for the user to communicate to the satellite set-top-box 200, and may be implemented using the peripheral interface 224 of control electronics unit 202 or by connecting a peripheral remote control interface device. In a preferred embodiment, a remote control interface may receive commands from one or more different remote controls 234. Remote control 234 may use infrared, UHF, or other communications technology. The remote control interface may therefore translate an input from the user into a format understandable by the control electronics unit 202. The translation systems may include, but are not limited to, electronic receivers and electronic relays. One skilled in the art will recognize that other means to receive and translate user inputs are possible.

Another peripheral device and connection to the satellite set-top-box 200 may include a phone line (not shown) and modem (not shown). Set-top-box 200 may use a modem and phone line to communicate with one or more outside entities or systems (e.g., satellite television distributor 104). The phone line may carry local or long-distance telephone service. One skilled in the art will recognize that the phone line may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite set-top-box 100. For example, the phone line may communicate with the satellite set-top-box 100 using an RJ-11 style telephone connection. One skilled in the art will recognize that there are many other uses for this phone line connection. For example, EPG data may be transmitted to set-top-box 200 via phone line or in the satellite signal 204. One skilled in the art will recognize that the EPG data may be transmitted to set-top-box 200 by various other methods, systems and outside entities. Also, one skilled in the art will recognize that a phone line connection to satellite distributor 104 may represent other communication connections, including, but not limited to, wireless, Internet, or microwave communications connections. Another function of the phone line may be to periodically receive the EPG data.

In a preferred embodiment, the satellite television distributor 104 establishes the themes for the electronic program guide. Once the themes are established, the satellite television distributor 104 may determine the channels that will be associated with the different themes. This process may require the satellite television distributor 104 to determine the typical or customary programming that is shown on each channel. For example, as stated before, "HBO" may be categorized by satellite television distributor 104 as a "Movies" channel although "HBO" may show programs that are not movies. In a preferred embodiment, the EPG information contains data that associates channels with a predetermined theme.

FIG. 3 shows one embodiment of a theme-based electronics program guide 300. As set forth in this embodiment, a theme-based EPG may take the form of a grid. This depicted guide will be used herein as an example. Thematic EPG 300 may be displayed in response to some user input. For example, thematic EPG 300 may be displayed on television 120 after a user presses an "EPG" button on remote control 126 more than one time. In this example, pressing an EPG button once may display a non-thematic EPG, pressing an EPG button two times may cycle to a thematic EPG 300 displaying "News" channels, and pressing an EPG button three times may cycle to a thematic EPG displaying "Sports" channels. One skilled in the art will recognize that many ways of commanding the display of thematic EPGs are possible and within the scope of this invention. For instance, a remote control 126 may contain multiple EPG buttons for displaying one or more thematic EPGs 300.

In the present embodiment, thematic EPG 300 displays channels associated with a "News" theme 318. The thematic EPG 300 may display the thematic category 302 for the channels that are displayed. A thematic EPG 300 may also display other program data including, but not limited to, a channel name 304, a channel number 308, and a program time 310. As set forth by the present embodiment, the channels displayed in a thematic EPG 300 may take the form of a list. This list may or may not be alphabetical or ordered. For example, the "FOX News Channel" 306 associated with channel number "205" 312 may precede the "EPSNews" channel 318. In this example, channels 306 and 318 are not listed in alphabetical or numerical order. One skilled in the art will recognize that many types of program information may be displayed within the thematic EPG. As one example, the "FOX News Channel" 306 displays the "FOX Report" 314 program title.

FIG. 4 shows another screen of a theme-based electronic program guide 400. In this screen, thematic EPG 400 displays channels associated with a "Sports" theme 410. Other examples of themes may include, but are not limited to, categories such as movies, news, religion, shopping, adult entertainment and foreign language channels. One skilled in the art will recognize that other thematic categories may be possible. One skilled in the art will also recognize that many different types of information for display in an electronic program guide are possible.

As set forth in this embodiment, one or more television channels and associated channel information may be displayed within a theme. One skilled in the art will recognize that other information may associated with a theme, including, but not limited to, program descriptions, program durations, program ratings and other information.

The channels associated with themes may not depend upon the programs shown on those channels. For example, as set forth in this embodiment, "The Golf Channel" 406 may be listed under the "Sports" theme despite showing a movie (e.g., "Bobby Jones, Stroke of Genuis" at the 8:00 timeslot) that might otherwise, for example, be categorized under a "Movies" theme. The present invention does not associate channels by current programming. Rather, in a preferred embodiment, the present invention associates channels with themes based upon the customary or typical programming content for a given content service provider. In other words, "HBO" may be associated with the "Movies" theme because it typically shows movies, even though it does not always show movies. One skilled in the art will recognize that other ways of associating programs into thematic categories are possible and within the scope of this invention. For example, one channel be associated with multiple categories. As shown, the "ESPNews" channel 318, 412 may be associated with both the "News" and "Sports" thematic EPGs 300, 400 since it customarily shows programming related to both themes.

A user may be able to alter the appearance of the thematic EPG 400. The user may change the order of the channels listed under each theme. For instance, the subscriber may put "ESPN" at the top of the "Sports" thematic EPG 400 rather than "Fox Sports World." It should be noted that a thematic EPG may not display all channels that may be associated with a certain theme. In addition, as shown by blank row 408, there may be fewer channels associated with a theme than can possibly be displayed by a full screen of the thematic EPG 400.

In a preferred embodiment, the broadcast EPG information may contain data that associates channels with themes. Such information can be received by set top box 200 and be stored in volatile memory 214. When the user selects the display of a thematic EPG, the CPU 212 may select for display in EPG format only the channels that correspond to the selected thematic category. The user can then filter EPG information for those channels that may be of particular interest. In this way, the satellite television broadcaster can provide the user with convenient, pre-determined sub-lists of channels. Moreover, with this architecture, satellite television broadcasters can add and subtract channels from the various categories by modifying the EPG data. Further, it will be recognized that the broadcaster could associate a channel with a category based upon an arrangement with the channel provider. Thus, CNN could pay the broadcaster to include their channel in a thematic list of channels for news.

It will be clear that the present invention is well adapted to attain the ends and advantages mentioned as well as those inherent therein. While a presently preferred embodiment in the form of a satellite set-top-box has been described for purposes of this disclosure, various changes and modifications may be made which are well within the scope of the present invention. For example, an additional algorithm could be included that automatically assigns channels to predetermined themes at the satellite set-top-box. Numerous other changes may be made which will readily suggest themselves to those skilled in the art and which are encompassed in the spirit of the invention disclosed and as defined in the appended claims.

I claim:

1. A method for displaying filtered electronic program guide information, the method comprising:

receiving from a head end electronic program guide information at a client device, the electronic program information associated with a plurality of channels, wherein each of the plurality of channels is associated, prior to receiving from the head end, with at least one theme based upon the customary or typical programming displayed on such channel, and wherein the at least one theme is associated with the channel regardless of the current programming on such channel;

receiving a first user input at the client device corresponding to a first press of an electronic program guide button of a remote control;

outputting a non-thematic representation of the electronic program guide information for display responsive to the first user input, wherein the non-thematic representation displays all channels regardless of theme;

receiving, at the client device and during a display of the non-thematic representation of the electronic program guide information, a second user input corresponding to a second press of the electronic program guide button of the remote control;

identifying, by the client device, at least a first theme of the at least one theme associated with at least one of the channels; and outputting a thematic representation of the electronic program guide information for display responsive to the second input, the thematic representation including a subset of the plurality of channels, wherein each of the channels in the subset of channels is associated with the first theme, wherein the only channels displayed on the thematic representation are those that were previously associated at the head end with the first theme, wherein the first theme is associated with the subset of channels themselves and is not associated with particular programming being presented at the time of receiving the first or second input on any of the subset of channels, wherein the first theme and the subset of channels associated therewith is decided upon by a programming distributor at the head end and is not decided upon by a viewer associated with the client device.

2. The method of claim 1, further comprising:

receiving a third user input, at the client device corresponding to a third press of the electronic program guide button of the remote control; and outputting a different thematic representation of the electronic program guide information for display responsive to the third user input, the different thematic representation including a different subset of the plurality of channels, wherein each of channels in the different subset of channels is associated with a second theme identified by the client device.

3. The method of claim 2, wherein the third user input is received wherein the third user input is received during a display of the different non-thematic representation of the electronic program guide information.

* * * * *